(12) United States Patent
Tagami

(10) Patent No.: US 8,649,037 B2
(45) Date of Patent: Feb. 11, 2014

(54) IMAGE READING APPARATUS, IMAGE FORMING APPARATUS, METHOD OF READING IMAGE, AND RECORDING MEDIUM FOR READING ORIGINAL-DOCUMENT IMAGE AND GENERATING IMAGE DATA OF THE ORIGINAL-DOCUMENT IMAGE

(75) Inventor: Yuya Tagami, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 256 days.

(21) Appl. No.: 13/218,037

(22) Filed: Aug. 25, 2011

(65) Prior Publication Data

US 2012/0069410 A1 Mar. 22, 2012

(30) Foreign Application Priority Data

Sep. 21, 2010 (JP) ................................. 2010-211365

(51) Int. Cl.
*H04N 1/387* (2006.01)
*H04N 1/46* (2006.01)

(52) U.S. Cl.
USPC .......... 358/1.14; 358/452; 358/453; 358/504; 358/537; 358/538; 358/539; 358/1.5; 358/1.6

(58) Field of Classification Search
None
See application file for complete search history.

(56) References Cited

U.S. PATENT DOCUMENTS

| 7,006,257 B1 | 2/2006 | Yamazaki et al. |
| 2001/0017709 A1 | 8/2001 | Murakami et al. |
| 2008/0159766 A1 * | 7/2008 | Tanaka ........................... 399/74 |

FOREIGN PATENT DOCUMENTS

| JP | 2011-148782 | 5/2001 |
| JP | 2001-218010 | 8/2001 |
| JP | 2004-112608 | 4/2004 |

* cited by examiner

*Primary Examiner* — Benny Q Tieu
*Assistant Examiner* — Haris Sabah
(74) *Attorney, Agent, or Firm* — K&L Gates LLP

(57) ABSTRACT

An image reading apparatus reads an original-document image and generates image data of the original-document image, and includes an image reading unit, a security pattern detection unit, and a main control unit. The image reading unit reads the original-document image and sequentially generates the image data of the original-document image as a plurality of pieces of band data. The security pattern detection unit performs security pattern detection processing on band data of a single band to detect a portion or an entirety of a security pattern included therein. The main control unit causes the security pattern detection unit to perform the security pattern detection processing on band data of a single band having the lowest background color density and not on band data of a single band having the greatest background color density, among the plurality of pieces of band data.

7 Claims, 5 Drawing Sheets

US 8,649,037 B2

IMAGE READING APPARATUS, IMAGE FORMING APPARATUS, METHOD OF READING IMAGE, AND RECORDING MEDIUM FOR READING ORIGINAL-DOCUMENT IMAGE AND GENERATING IMAGE DATA OF THE ORIGINAL-DOCUMENT IMAGE

INCORPORATION BY REFERENCE

This application is based upon and claims the benefit of priority from the corresponding Japanese Patent application No. 2010-211365, filed Sep. 21, 2010, the entire contents of which is incorporated herein by reference.

BACKGROUND

The present invention relates to image reading apparatuses, image forming apparatuses, methods of reading images, and recording media for reading original-document images and generating the image data of the original-document images.

It is known to prevent the printing of a copied image using an image forming apparatus, when a specific security pattern, such as a copy-forgery-inhibiting pattern, is included in the original-document image.

In the technique described above, the image of a single page of the original document is divided into a plurality of bands before being processed. To detect the security pattern at high speeds, detection of a security pattern is not performed for a band wherein the ratio of the number of blank pixels to the total number of pixels within the band is greater than or equal to a predetermined threshold. Although detection of a security pattern is not performed for bands including a large blank portion, it still takes a long time to detect a security pattern if there are few of such bands.

SUMMARY

An image reading apparatus according to an embodiment of the present disclosure is provided that reads an original-document image and generates image data of the original-document image. The apparatus includes: an image reading unit, a security pattern detection unit, and a main control unit. The image reading unit reads the original-document image and sequentially generates the image data of the original-document image as a plurality of pieces of band data. The security pattern detection unit performs security pattern detection processing on band data of a single band and when the band data of the single band includes a portion or an entirety of a security pattern, detects the portion or the entirety of the security pattern. The main control unit causes the security pattern detection unit not to perform the security pattern detection processing on band data of a single band having the greatest background color density and to perform the security pattern detection processing on band data of a single band having the lowest background color density, among the plurality of pieces of band data.

An image forming apparatus according to another embodiment of the present disclosure is provided that reads an original-document image and generates image data of the original-document image. The apparatus includes: an image reading unit, a security pattern detection unit, a main control unit, and an image forming unit. The image reading unit reads the original-document image and sequentially generates the image data of the original-document image as a plurality of pieces of band data. The security pattern detection unit performs security pattern detection processing on band data of a single band and when the band data of the single band includes a portion or an entirety of a security pattern, detects the portion or the entirety of the security pattern. The main control unit that causes the security pattern detection unit not to perform the security pattern detection processing on band data of a single band having the greatest background color density and to perform the security pattern detection processing on band data of a single band having the lowest background color density, among the plurality of pieces of band data. When a portion or an entirety of a security pattern is detected by the security pattern detection unit, the main control unit prevents the formation of an image of a copy of the original-document image by the image forming unit or causes image forming to be performed after predetermined image processing is performed on the copy of the original-document image.

A method of reading an original-document image according to another embodiment of the present disclosure is provided having reading an original-document image and generating image data of the original-document image. The method includes: image reading, security pattern detection, and a main controlling. The image reading is reading the original-document image and sequentially generating the image data of the original-document image as a plurality of pieces of band data. The security pattern detection is performing security pattern detection processing on band data of a single band and when the band data of the single band includes a portion or an entirety of a security pattern, detecting the portion or the entirety of the security pattern. The main controlling causes the security pattern detection processing on band data of a single band having the greatest background color density to be not performed and causes the security pattern detection processing on band data of a single band having the lowest background color density to be performed, among the plurality of pieces of band data.

A recording medium according to another embodiment of the present disclosure is a non-transitory computer readable recording medium that stores an image reading program which causes a computer to function as an image reading apparatus. The program causes the computer to function as: an image reading unit, a security pattern detection unit, and a main control unit. The image reading unit reads the original-document image and sequentially generates the image data of the original-document image as a plurality of pieces of band data. The security pattern detection unit performs security pattern detection processing on band data of a single band and when the band data of the single band includes a portion or an entirety of a security pattern, detects the portion or the entirety of the security pattern. The main control unit causes the security pattern detection unit not to perform the security pattern detection processing on band data of a single band having the greatest background color density and to perform the security pattern detection processing on band data of a single band having the lowest background color density, among the plurality of pieces of band data.

Additional features and advantages are described herein, and will be apparent from the following Detailed Description and the figures.

DETAILED DESCRIPTION

Reference will now be made to various embodiments of the disclosure, one or more examples of which are illustrated in the accompanying drawings. Each example is provided by way of explanation of the disclosure, and by no way limiting the present disclosure. In fact, it will be apparent to those skilled in the art that various modifications, combinations, additions, deletions and variations can be made in the present disclosure without departing from the scope or spirit of the present disclosure. For instance, features illustrated or described as part of one embodiment can be used in another embodiment to yield a still further embodiment. It is intended that the present disclosure covers such modifications, combinations, additions, deletions, applications and variations that come within the scope of the appended claims and their equivalents.

Hereinafter, embodiments of the present disclosure are described with reference to the attached drawings.

Figure 1:
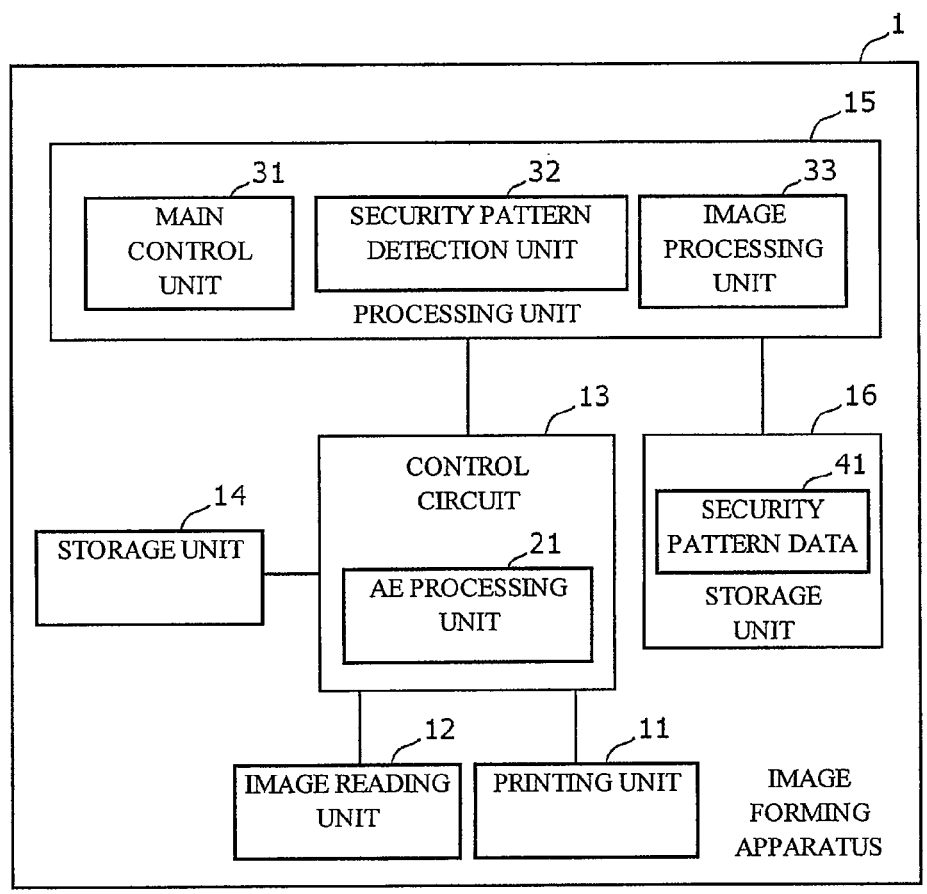
FIG. 1 is a block diagram of a configuration of an image forming apparatus according to an embodiment.

FIG. 1 is a block diagram of a configuration of an image forming apparatus according to an embodiment of the present disclosure. An image forming apparatus 1 illustrated in FIG. 1, which is one type of image reading apparatus, includes a printing unit 11. Hence, the image forming apparatus 1 is a Multifunction Peripheral having a printer function, a scanner function, and the like.

The image forming apparatus 1 includes the printing unit 11, an image reading unit 12, a control circuit 13, storage units 14 and 16, and a processing unit 15.

The printing unit 11 is an internal apparatus that prints document images based on print data. The image reading unit 12 is an internal apparatus that optically reads original-document images and generates image data of the original-document images. The image reading unit 12 generates a series of pieces of band data as the image data of the original-document images. A piece of band data is the image data of a band. A band is formed of a predetermined plurality of lines consecutively arranged in a sub-scanning direction. A line is a row of pixels arranged along a main scanning direction.

The control circuit 13 is a circuit that controls the printing unit 11 so that the printing unit 11 prints, controls the image reading unit 12 so that the image reading unit 12 reads original-document images, and sequentially obtains pieces of band data and stores the pieces of band data in the storage unit 14. The control circuit 13 can be in the form of, for example, an application specific integrated circuit (ASIC).

The control circuit 13 includes an AE processing unit 21. The AE processing unit 21 performs automatic exposure processing on band data generated by the image reading unit 12, and measures the background color density for each band data at the time of automatic exposure processing. The background color density is used for automatic gamma correction, for example.

The storage unit 14 temporarily stores data handled by the control circuit 13. A large capacity storage medium such as a memory device or a hard disk drive can be used as the storage unit 14.

A processing unit 15 is a computer including a central processing unit (CPU), a read only memory (ROM), a random access memory (RAM), and the like. The processing unit 15 provides various processing units by loading programs from the ROM, the storage unit 16, or the like into the RAM, and executing the programs. The storage unit 16 is a non-volatile storage apparatus formed of a non-volatile memory, a hard disk drive, or the like.

In the illustrated embodiment, the processing unit 15 provides a main control unit 31, a security pattern detection unit 32, and an image processing unit 33. Security pattern data 41 is stored in the storage unit 16 in advance.

The main control unit 31 controls the security pattern detection unit 32 and the image processing unit 33 and causes the control circuit 13 to execute a scan job, a print job, and the like.

The main control unit 31 causes the security pattern detection unit 32 to perform security pattern detection processing on the piece of band data having the lowest background color density among a plurality of pieces of band data read by the image reading unit 12. Specifically, in this embodiment, the main control unit 31 causes the security pattern detection unit 32 to perform the next security pattern detection processing on the piece of band data having the lowest background density among the plurality of pieces of band data generated by the image reading unit 12 during the period of the current security pattern detection processing performed by the security pattern detection unit 32. The main control unit 31 identifies the piece of band data having the lowest background color density among the plurality of pieces of band data based on the background color density measured by the control circuit 13 (AE processing unit 21).

The security pattern detection unit 32 performs security pattern detection processing on band data of a single band and, when there is a portion or an entirety of a security pattern in the band data, detects the portion or the entirety of the security pattern. Note that a number of known methods can be used to detect a security pattern in the band data.

The security pattern data 41 is data of security patterns. The security pattern detection unit 32 reads the security pattern data 41 and determines whether or not a portion or an entirety of a security pattern indicated by the security pattern data 41 is included in band data.

When a security pattern is detected by the security pattern detection unit 32, the image processing unit 33 performs predetermined image processing on the image data generated by the image reading unit 12.

Hereinafter, operation of the image forming apparatus 1 according to the embodiment set forth above is described.

Figure 2:
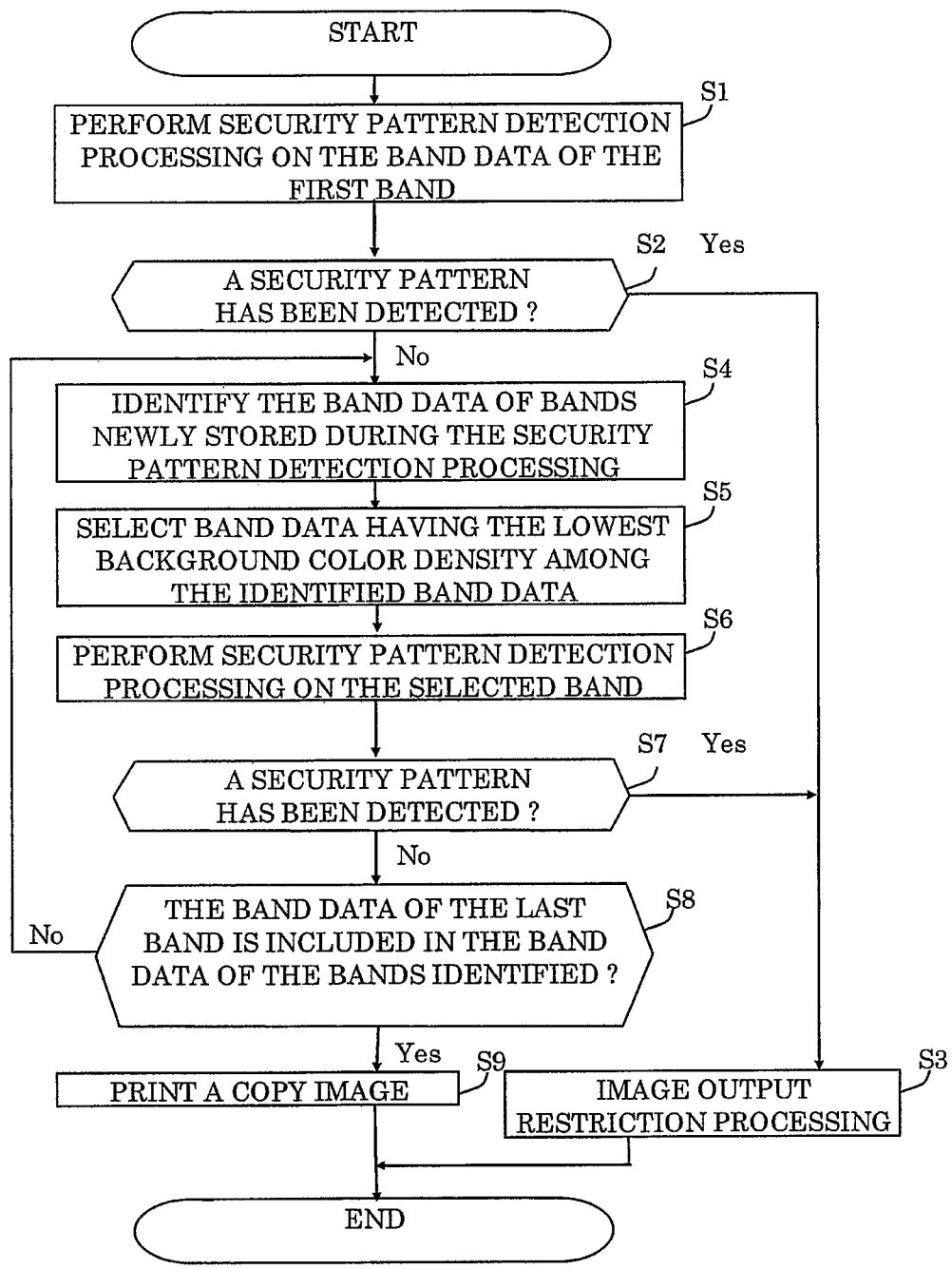
FIG. 2 is a flowchart illustrating an operation of the image forming apparatus according to the embodiment of FIG. 1.

FIG. 2 is a flowchart illustrating the operation of the image forming apparatus 1 according to an embodiment of the present disclosure.

The control circuit 13, when receiving a scan-job command from the main control unit 31, starts to read an original-document image by controlling the image reading unit 12, and continues to generate a piece of band data every time an image corresponding to a single band has been read and writes the band data into the storage unit 14. The AE processing unit 21 calculates the background color density of the generated band data. The background color density ranges, for example, from 0 to 31.

The main control unit 31, when the band data of the first band is stored in the storage unit 14, causes the security pattern detection unit 32 to perform security pattern detection processing on the band data (step S1). The security pattern detection unit 32 reads the band data specified by the main control unit 31 from the storage unit 14 and performs the security pattern detection processing.

When the security pattern detection processing is completed, the main control unit 31 determines whether or not a security pattern has been detected in the band data (step S2).

When a security pattern has been detected in the security pattern detection processing, the main control unit 31 finishes security pattern detection processing on the original-document image of the page and performs image output restriction processing for the page (step S3). In the image output restriction processing, the image data is processed by the image processing unit 33 so as to cause the original-document image to be uninterpretable when printed, or prevents the printing unit 11 from printing the original-document image.

On the other hand, when a security pattern is not detected by the security pattern detection processing on the first band data, the main control unit 31 identifies the band data of bands newly stored in the storage unit 14 during the security pattern detection processing (i.e., image data of bands read during the security pattern detection processing) (step S4).

Then, the main control unit 31 selects band data having the lowest background color density based on the background color densities of the identified band data (step S5). Note that the background color densities of respective pieces of band data are sequentially stored in, for example, the storage unit 14, and are read by the main control unit 31.

The main control unit 31 causes the security pattern detection unit 32 to perform security pattern detection processing on the selected band data (step S6).

When the security pattern detection processing is completed, the main control unit 31 determines whether or not a security pattern has been detected in the band data (step S7).

When a security pattern is detected in the security pattern detection processing, the main control unit 31 finishes security pattern detection processing on the original-document image of a single page and performs image output restriction processing for this page (step S3).

On the other hand, when a security pattern has not been detected in the security pattern detection processing, the main control unit 31 determines whether or not the band data of the last band is included in the band data of the bands identified in step S4 (step S8).

Note that the number N of bands per original-document image of a single page is fixed. For example, data numbers 1 to N are sequentially assigned to the band data of bands within a page in the order of generation, and it is determined whether or not the band data of the last band is included in the band data of the bands identified in step S4 based on the data number.

When the band data of the last band is not included in the band data of bands identified in step S4, the flow goes back to step S4. The main control unit 31 and the security pattern detection unit 32 perform the processing of steps S4 to S8 for band data of bands newly stored in the storage unit 14 during the security pattern detection processing in step S6 (i.e., for the image data of bands read during the security pattern detection processing).

On the other hand, when the band data of the last band is included in the band data of bands identified in step S4, this means that security pattern detection processing has been completed for up to the last band data of the original-document image, but a security pattern has not been detected. Hence, the main control unit 31 sends a print job command to the control circuit 13, thereby causing the printing unit 11 to print a copy image based on the image data generated by the image reading unit 12 (step S9).

Hereinafter, a specific example of detecting a security pattern is described.

Figure 3:
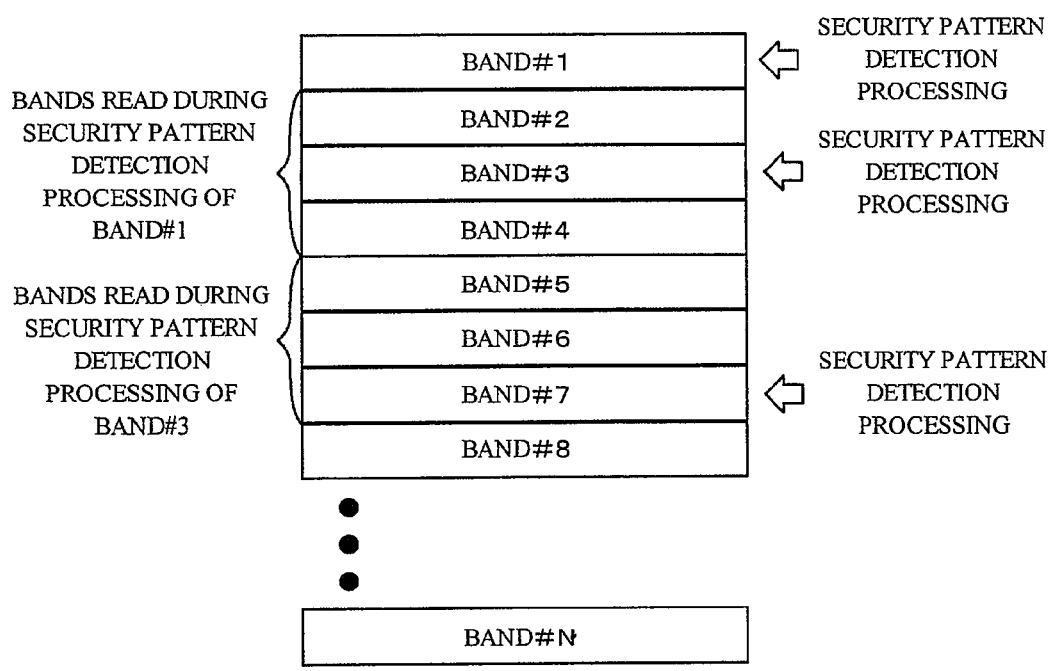
FIG. 3 illustrates an exemplary band to be processed in security pattern detection processing in the image forming apparatus illustrated in FIG. 1.

FIG. 3 illustrates an exemplary band to be processed in security pattern detection processing in the image forming apparatus 1 illustrated in FIG. 1.

Referring to FIG. 3, security pattern detection processing is first performed on the first band (step S1). When the image of the second to fourth bands is read during this security pattern detection processing, a band which has the lowest background color density among the second to fourth bands is identified (here, the third band) (step S5). Then security pattern detection processing is performed on the selected band (third band) (step S6). At this time, security pattern detection processing is not performed on bands (second and fourth bands) other than the identified band.

Further, when the image of the fifth to seventh bands is read during this security pattern detection processing, a band which has the lowest background color density among the fifth to seventh bands is identified (here, the seventh band) (step S5). Then security pattern detection processing is performed on the identified band (seventh band) (step S6).

After this, selection of band data and security pattern detection processing on the selected band data are performed concurrently with the reading of original-document images until a security pattern is detected or the last band is detected.

The situation where security pattern detection processing is performed only for a single band having the lowest background color density among three bands has been described above. However, it should be noted that any method may be used wherein security pattern detection processing is not performed on the band having the greatest background color density and security pattern detection processing is performed on the band having the lowest background color density. For example, a method may be used wherein security pattern detection processing is performed on the band having the lowest background color density and the band having the second lowest background color density, and security pattern detection processing is not performed on the band having the third lowest background color density (i.e., the band having the greatest background color density).

Figure 4:
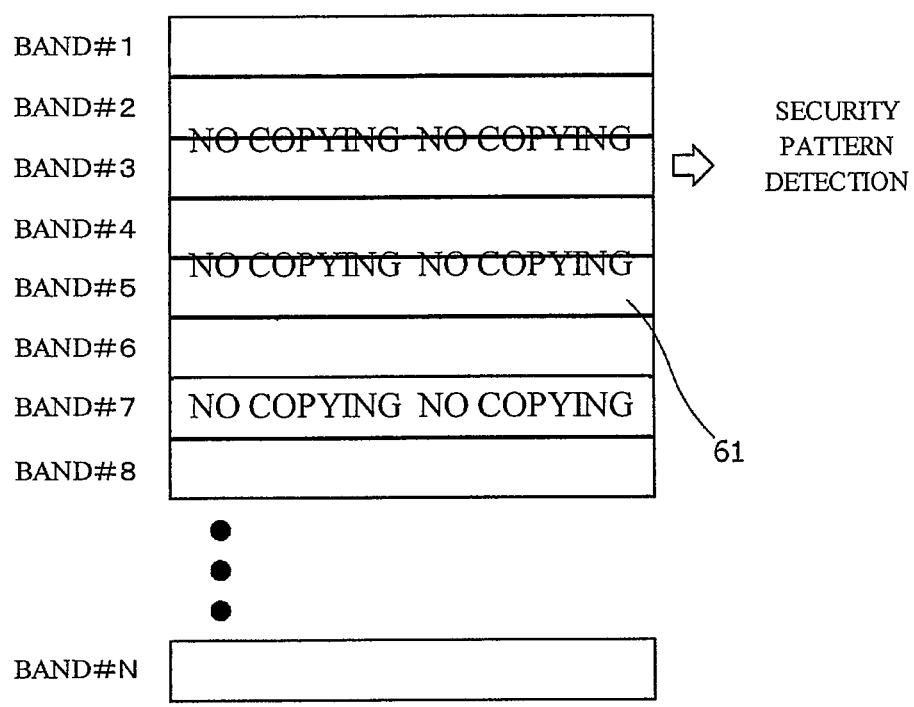
FIG. 4 illustrates an exemplary security pattern detected by security pattern detection processing in the image forming apparatus illustrated in FIG. 1.

FIG. 4 illustrates an exemplary security pattern detected by security pattern detection processing in the image forming apparatus 1 illustrated in FIG. 1. For example, when an original-document image contains a security pattern 61 that includes the phrase "no copying" as illustrated in FIG. 4, the security pattern 61 is detected in security pattern detection processing on the third band. Hence, security pattern detection processing on this original-document image is completed only by performing security pattern detection processing twice, that is, on the first and third bands.

As has been described above, according to the above embodiment, the image reading unit 12 reads an original-document image and sequentially generates image data of the original-document image as a plurality of pieces of band data. The security pattern detection unit 32 performs security pattern detection processing on band data of a single band. In the security pattern detection processing, when this band data of the single band includes a portion or an entirety of a security pattern, the security pattern detection unit 32 detects the portion or the entirety of the security pattern. The main control unit 31 causes the security pattern detection unit 32 to perform security pattern detection processing on band data of the single band having the lowest background color density, among the plurality of pieces of band data.

As a result, since security pattern detection processing is not performed for band data having a great background color density, detection of a security pattern can be performed quickly using software without using, for example, a hardware accelerator. Further, detection of a security pattern can be accurately performed even when the processing unit 15 has a slower processing speed than the image reading unit 12 and the control circuit 13.

According to the embodiment described above, the main control unit 31 causes the security pattern detection unit 32 to perform the next security pattern detection processing on band data of the single band having the lowest background color density among the plurality of pieces of band data generated by the image reading unit 12 during the current security pattern detection processing performed by the security pattern detection unit 32.

As a result, security pattern detection processing can be concurrently performed by the security pattern detection unit 32 while the image reading unit 12 reads original-document images. Hence, the period of time from the start of reading an original-document image to detection of a security pattern is reduced.

In an image forming apparatus according to another embodiment of the present disclosure, security pattern detection processing is performed only for a color plane having the lowest background color density among a plurality of color planes.

In this embodiment, the image reading unit 12 sequentially generates pieces of band data for each of a plurality of color planes (for example, cyan, magenta, yellow, and black planes). The AE processing unit 21 calculates the background color density of band data for each of the plurality of color planes.

The main control unit 31 causes the security pattern detection unit 32 to perform security pattern detection processing only for a color plane having the lowest background color density among the plurality of color planes. In this embodiment, the main control unit 31 identifies the color plane of the piece of band data having the lowest background color density, among the respective pieces of first band data of the plurality of color planes, as the color plane having the lowest background color density. Note that in the case of color planes of cyan, magenta, yellow, and black, a color plane having the lowest background color density may be identified from among the color planes of three colors other than yellow. Accuracy of detection of the security pattern can be increased by excluding yellow, since it is more difficult to detect a security pattern with yellow than with the other colors.

The operation of the image forming apparatus 1 according to this embodiment will now be described.

Figure 5:
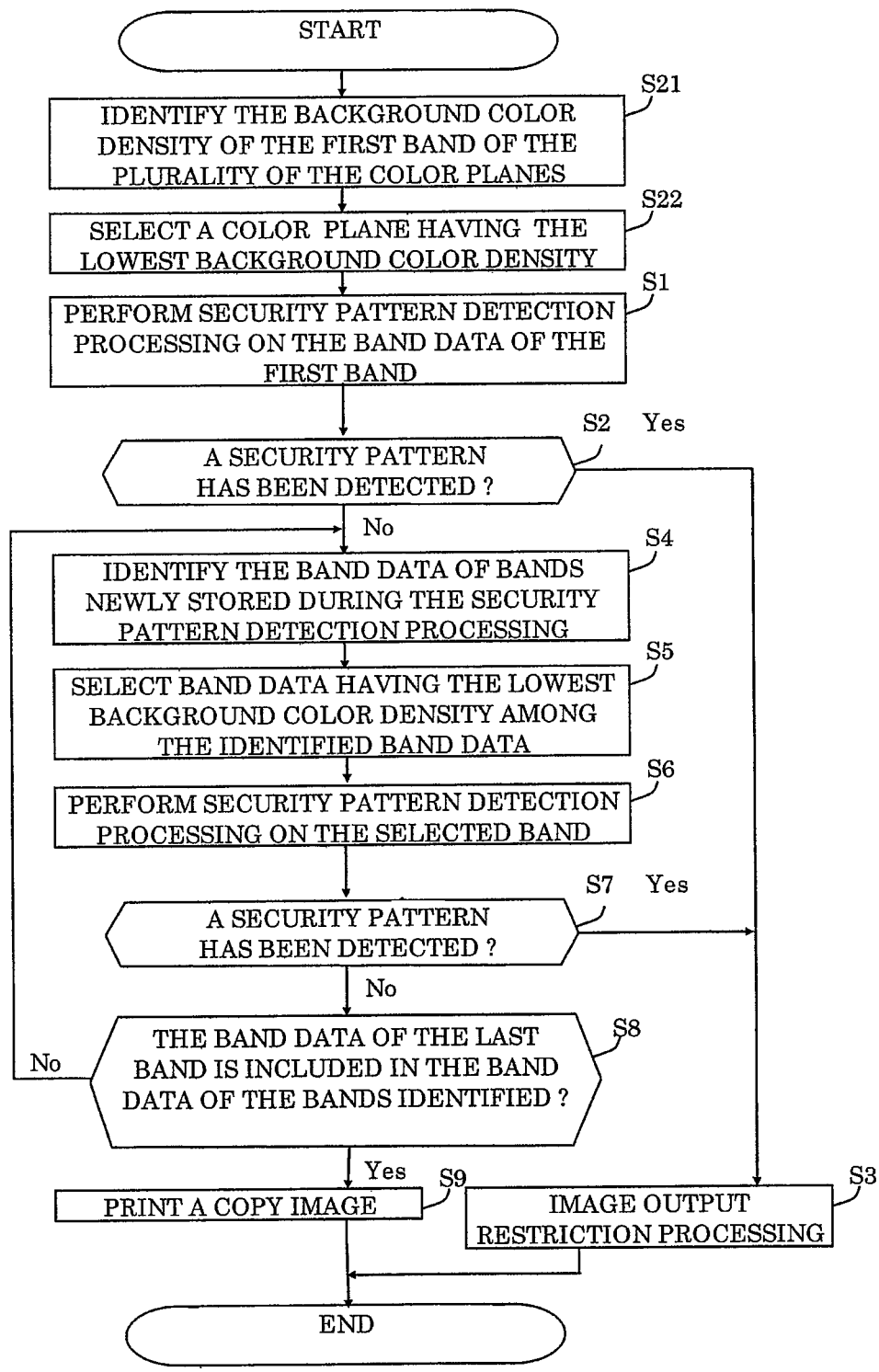
FIG. 5 is a flowchart illustrating an operation of an image forming apparatus according to another embodiment.

FIG. 5 is a flowchart illustrating the operation of the image forming apparatus 1 according to this embodiment.

The control circuit 13, when receiving a scan-job command from the main control unit 31, starts to read an original-document image by controlling the image reading unit 12, and continues to generate a piece of band data of each color plane every time an image corresponding to a single band has been read and writes the band data into the storage unit 14. The AE processing unit 21 calculates the background color density of the generated band data.

The main control unit 31, when the band data of the first band of a plurality of color planes are stored in the storage unit 14, identifies the background color densities of the first bands of the plurality of the color planes (step S21). Then, the main control unit 31 selects the color plane having the lowest background color density (step S22).

Then, processing (steps S1 to S9) similar to that of the first discussed embodiment is performed for the band data of the selected color plane.

As described above, according to this embodiment, the image reading unit 12 sequentially generates pieces of band data for each of a plurality of color planes. Then, the main control unit 31 causes the security pattern detection unit 32 to perform security pattern detection processing only for a color plane having the lowest background color density among the plurality of color planes.

As a result, when an original-document image is a color image, since security pattern detection processing is performed only for a single color plane, security pattern detection processing can be quickly performed.

Although the embodiments described above are exemplified embodiments of the present invention, the present disclosure is not limited to these. Various variations and modifications are possible within the purpose and scope of the present disclosure.

For example, although the image processing unit 33 is achieved by the processing unit 15 in the embodiments described above, the image processing unit 33 may instead be included in the control circuit 13.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An image reading apparatus that reads an original-document image and generates image data of the original-document image, the apparatus comprising:
   an image reading unit that reads the original-document image and sequentially generates the image data of the original-document image as a plurality of pieces of band data;
   a security pattern detection unit that performs security pattern detection processing on band data of a single band and when the band data of the single band includes a portion or an entirety of a security pattern, detects the portion or the entirety of the security pattern; and
   a control circuit unit that measures a background color density of each of the plurality of pieces of the band data; and
   a main control unit that causes the security pattern detection unit not to perform the security pattern detection processing on the band data of the single band having greatest background color density measured and to perform the security pattern detection processing on the band data of the single band having lowest background color density measured, among the plurality of pieces of the band data,
   wherein the image reading unit sequentially generates the plurality of pieces of band data for each of a plurality of color planes, and
   the main control unit causes the security pattern detection unit to perform the security pattern detection processing only for a single color plane having the lowest background color density among the plurality of the color planes,
   wherein the main control unit identifies a color plane of band data of the single band having the lowest background color density, among the respective pieces of first band data of the plurality of the color planes, as the single color plane having the lowest background color density, wherein the main control unit causes the security pattern detection unit to perform the security pattern detection processing only for a-the single color plane having the lowest background color density among the plurality of the color planes excluding a yellow plane.

2. The image reading apparatus according to claim 1, wherein the security pattern detection unit performs the security pattern detection processing on the band data of the single band having lowest background color density, among the plurality of pieces of the band data generated by the image reading unit during the security pattern detection processing.

3. The image reading apparatus according to claim 1, wherein the control circuit performs automatic exposure processing on the plurality of pieces of the band data generated by the image reading unit,
and
the main control unit identifies the band data of the single band having the lowest background color density among the plurality of pieces of the band data based on the background color density measured by the control circuit.

4. The image reading apparatus according to claim 1, wherein, when the portion or the entirety of the security pattern has been detected by the security pattern detection unit for the original-document image, the main control unit causes the security pattern detection processing on the original-document image to be terminated without causing the security pattern detection processing to be performed on remaining pieces of band data.

5. An image forming apparatus that reads an original-document image and generates image data of the original-document image, the apparatus comprising:
an image reading unit that reads the original-document image and sequentially generates the image data of the original-document image as a plurality of pieces of band data;
a security pattern detection unit that performs security pattern detection processing on band data of a single band and when the band data of the single band includes a portion or an entirety of a security pattern, detects the portion or the entirety of the security pattern;
a control circuit unit that measures a background color density of each of the plurality of pieces of the band data;
a main control unit that causes the security pattern detection unit to not perform the security pattern detection processing on the band data of the single band having greatest background color density measured and to perform the security pattern detection processing the band data of the single band having the lowest background color density measured, among the plurality of pieces of the band data; and
an image forming unit, the main control unit, when the portion or an entirety of the security pattern is detected by the security pattern detection unit, prevents formation of an image of a copy of the original-document image by the image forming unit or causes image forming to be performed after predetermined image processing is performed on the copy of the original-document image,
wherein the image reading unit sequentially generates the plurality of pieces of band data for each of a plurality of color planes, and
the main control unit causes the security pattern detection unit to perform the security pattern detection processing only for a single color plane having the lowest background color density among the plurality of the color planes,
wherein the main control unit identifies a color plane of band data of the single band having the lowest background color density, among the respective pieces of first band data of the plurality of the color planes, as the single color plane having the lowest background color density,
wherein the main control unit causes the security pattern detection unit to perform the security pattern detection processing only for a-the single color plane having the lowest background color density among the plurality of the color planes excluding a yellow plane.

6. A method of reading an original-document image and generating image data of the original-document image, the method comprising:
reading an image of the original-document and sequentially generating image data as a plurality of pieces of band data; performing security pattern detection processing on band data of a single band and when the band data of the single band includes a portion or an entirety of a security pattern, detecting the portion or the entirety of the security pattern; and
measuring a background color density of each of the plurality of pieces of the band data; and
causing the security pattern detection processing to not be performed on the band data of the single band having greatest background color density measured and performing the security pattern detection processing on the band data of the single band having lowest background color density measured, among the plurality of pieces of band data,
wherein an image reading unit sequentially generates the plurality of pieces of band data for each of a plurality of color planes, and
a main control unit causes the security pattern detection unit to perform the security pattern detection processing only for a single color plane having the lowest background color density among the plurality of the color planes,
wherein the main control unit identifies a color plane of band data of the single band having the lowest background color density, among the respective pieces of first band data of the plurality of the color planes, as the single color plane having the lowest background color density,
wherein the main control unit causes the security pattern detection unit to perform the security pattern detection processing only for a-the single color plane having the lowest background color density among the plurality of the color planes excluding a yellow plane.

7. A non-transitory computer readable recording medium that stores an image reading program which causes a computer to function as an image reading apparatus, the program causing the computer to function as:
an image reading unit that reads the original-document image and sequentially generates the image data of the original-document image as a plurality of pieces of band data;
a security pattern detection unit that performs security pattern detection processing on band data of a single band and when the band data of the single band includes a portion or an entirety of a security pattern, detects the portion or the entirety of the security pattern;
a control circuit unit that measures a background color density of each of the plurality of pieces of the band data; and
a main control unit that causes the security pattern detection unit to not perform the security pattern detection processing on the band data of the single band having greatest background color density measured and to perform the security pattern detection processing on the band data of the single band having the lowest background color density measured, among the plurality of pieces of the band data, wherein the an image reading unit sequentially generates the plurality of pieces of band data for each of a plurality of color planes, and the main control unit causes the security pattern detection unit to perform the security pattern detection processing only for a single color plane having the lowest background color density among the plurality of the color planes, wherein the main control unit identifies a color plane of band data of the single band having the lowest background color density, among the respective pieces of first band data of the plurality of the color planes, as the single color plane having the lowest background color density, wherein the main control unit causes the security pattern detection unit to perform the security pattern detection processing only for a-the single color plane having the lowest background color density among the plurality of the color planes excluding a yellow plane.

* * * * *